United States Patent [19]

Homma et al.

[11] Patent Number: 5,179,643
[45] Date of Patent: Jan. 12, 1993

[54] METHOD OF MULTI-DIMENSIONAL ANALYSIS AND DISPLAY FOR A LARGE VOLUME OF RECORD INFORMATION ITEMS AND A SYSTEM THEREFOR

[75] Inventors: Koichi Homma, Yokohama; Akira Kagami, Kawasaki; Kichizo Akashi, Ebina; Shigeki Hirata, Kamakura; Hiroshi Mori, Ebina; Takayuki Aizawa, Matsudo, all of Japan

[73] Assignee: Hitachi, Ltd., Tokyo, Japan

[21] Appl. No.: 447,374

[22] Filed: Dec. 7, 1989

[30] Foreign Application Priority Data

Dec. 23, 1988 [JP] Japan .................................. 63-323292
Feb. 15, 1989 [JP] Japan .................................. 1-33574

[51] Int. Cl.⁵ .......................................... G06F 15/62
[52] U.S. Cl. ..................................... 395/140; 395/141; 364/401
[58] Field of Search ............................. 364/401–403, 364/518, 521, 147; 395/140, 141, 160

[56] References Cited

U.S. PATENT DOCUMENTS

| | | | |
|---|---|---|---|
| 4,613,946 | 9/1986 | Forman | 364/518 |
| 4,710,763 | 12/1987 | Franke et al. | 364/518 X |
| 4,745,549 | 5/1988 | Hashimoto | 364/402 |
| 4,752,889 | 6/1988 | Rappaport et al. | 364/513 |
| 4,775,935 | 10/1988 | Yourick | 364/401 |
| 4,802,162 | 1/1989 | Kakuda et al. | 364/900 X |
| 4,918,646 | 4/1990 | Hirose | 364/900 |
| 4,947,322 | 8/1990 | Tenma et al. | 364/401 |
| 5,016,170 | 5/1991 | Pollalis et al. | 364/401 |
| 5,041,972 | 8/1991 | Frost | 364/401 |

FOREIGN PATENT DOCUMENTS 63-261462 12/1988 Japan .
64-21571 1/1989 Japan .

OTHER PUBLICATIONS

Rowe et al., A Browser for Directed Graphs, Software-Practice and Experience, vol. 17 (1), pp. 61-76 (Jan. 1987).

Primary Examiner—Gary V. Harkcom
Assistant Examiner—Mark K. Zimmerman
Attorney, Agent, or Firm—Fay, Sharpe, Beall, Fagan, Minnich & McKee

[57] ABSTRACT

Method and system for extracting a characteristic from information handled by a computer and displaying the information in a manner to clarify the characteristic. A relationship among information items is analyzed from similarity and cluster analysis, and a characteristic related to the relationship is analyzed and displayed. The present invention is particularly useful in the analysis of merchandise information.

9 Claims, 11 Drawing Sheets

FIG. 1(a)
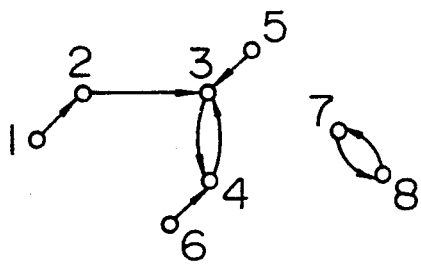
FIG. 1(b)
FIG. 1(c)
FIG. 1(d)
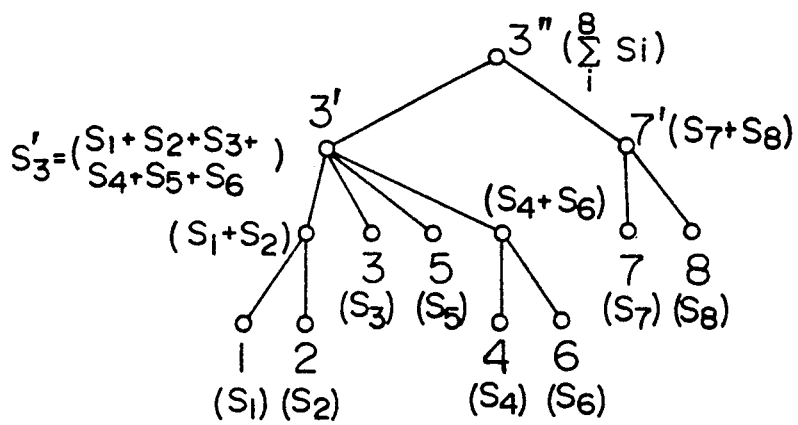
FIG. 3
| RECORD NO. | DISPLAY AREA | ATTRIBUTE | INFORMATION TO BE DISPLAYED |
|---|---|---|---|
| 1 | $S_1$ | $a_1 = (a_{11}, a_{12}, \cdots a_{1M})$ | $x_1$ |
| 2 | $S_2$ | $a_2 = (a_{21}, a_{22}, \cdots a_{2M})$ | $x_2$ |
| ⋮ | ⋮ | ⋮ | ⋮ |
| N | $S_N$ | $a_N = (a_{N1}, a_{N2}, \cdots a_{NM})$ | $x_N$ |

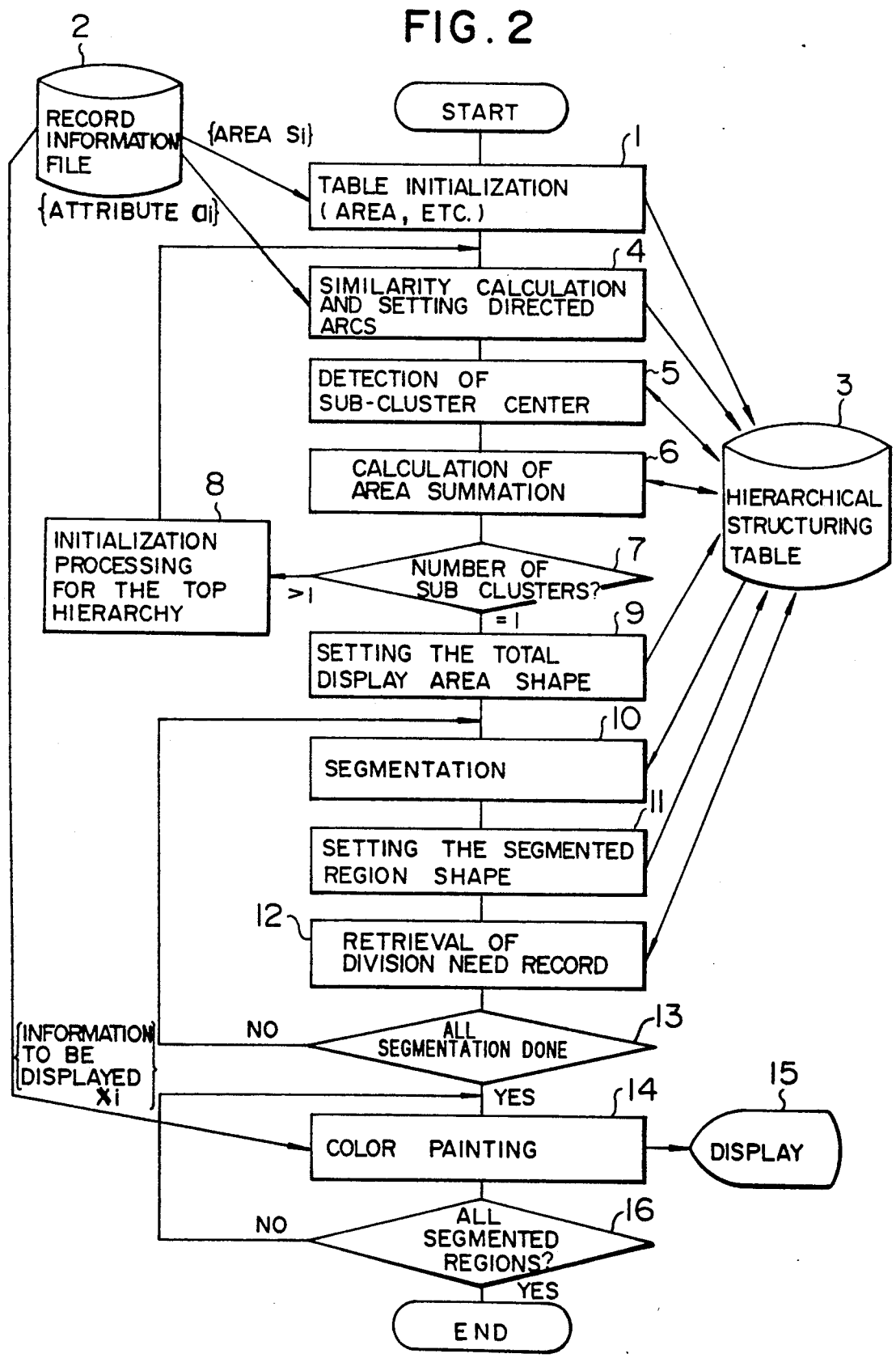

FIG. 4
| RECORD/SUB-CLUSTER # | AREA | TERMI-NAL | POINTER | START | FLAG | HIGH ORDER FLAG | ALL DISPLAY AREA | LOW ORDER # | COORDINATES OF SEGMENT REGION TOPS |
|---|---|---|---|---|---|---|---|---|---|
| 1 | $S_1$ | m(1)(-2) | 0 |  | 0 |  | $S_1$ |  |  |
| 2 | $S_2$ | m(2)(-3) | 1 | 1 | 0 |  | $S_1+S_2$ |  |  |
| N | $S_N$ | m(N) |  |  |  |  |  |  |  |
| i' | $S_i'$ |  |  |  |  |  |  |  |  |
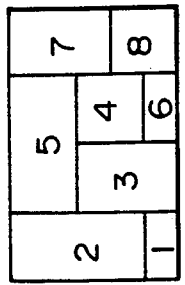
FIG.5(d)
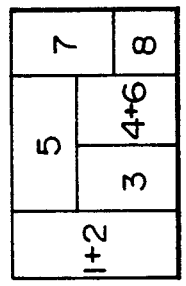
FIG.5(c)
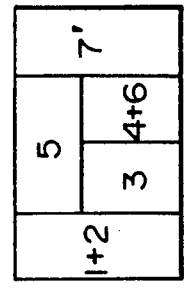
FIG.5(b)
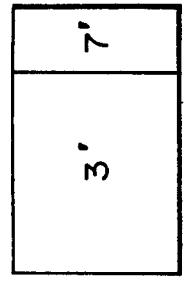
FIG.5(a)

| RECORD NO. | COORDINATES OF SEGMENTED REGION CENTERS |
|---|---|
| 1 | $(y_{11}, y_{12})$ |
| 2 | $(y_{21}, y_{22})$ |
| ⋮ | ⋮ |
| 3 | $(y_{N1}, y_{N2})$ |

| RECORD NO. | COORDINATE SERIES OF REGION VERTICES |
|---|---|
| 1 | $(y_1, y_2, \cdots, y_4)$ |
| 2 | $(y_1^2, y_2^2, \cdots, y_5^2)$ |
| ⋮ | ⋮ |
| N | $(y_1^N, y_2^N, \cdots, y_{C_N}^N)$ |

25

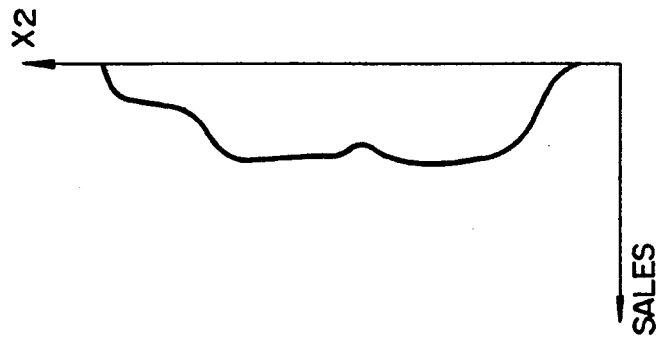
FIG. 10(c)
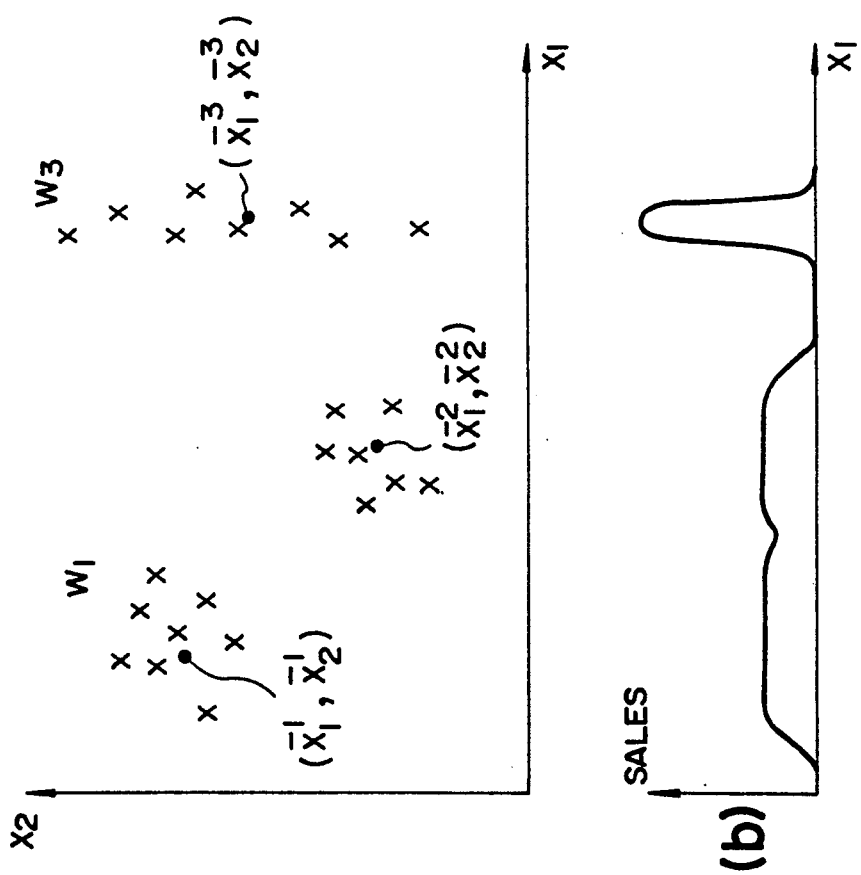
FIG. 10(a)
FIG. 10(b)

| MERCHANDISE CODE | SET OF FREE KEY WORDS |
|---|---|
| 1 | $a_1^1, a_2^1, \cdots, a_{m(1)}^1$ |
| 2 | $a_1^2, a_2^2, \cdots, a_{m(2)}^2$ |
| ⋮ | --- |
| n | $a_1^n, a_2^n, \cdots, a_{m(n)}^n$ |

| JOINT SET OF FREE KEY WORDS / MERCHANDISE CODE | $a_1^x$ | $a_2^x$ | $a_3^x$ | $a_4^x$ | | $a_{N-1}^x$ | $a_N^x$ |
|---|---|---|---|---|---|---|---|
| 1 | 1 | 0 | 1 | 1 | --- | 1 | 0 |
| 2 | 0 | 0 | 0 | 0 | --- | 1 | 1 |
| ⋮ | | | | | | | |
| 3 | 0 | 1 | 0 | 0 | --- | 0 | 1 |

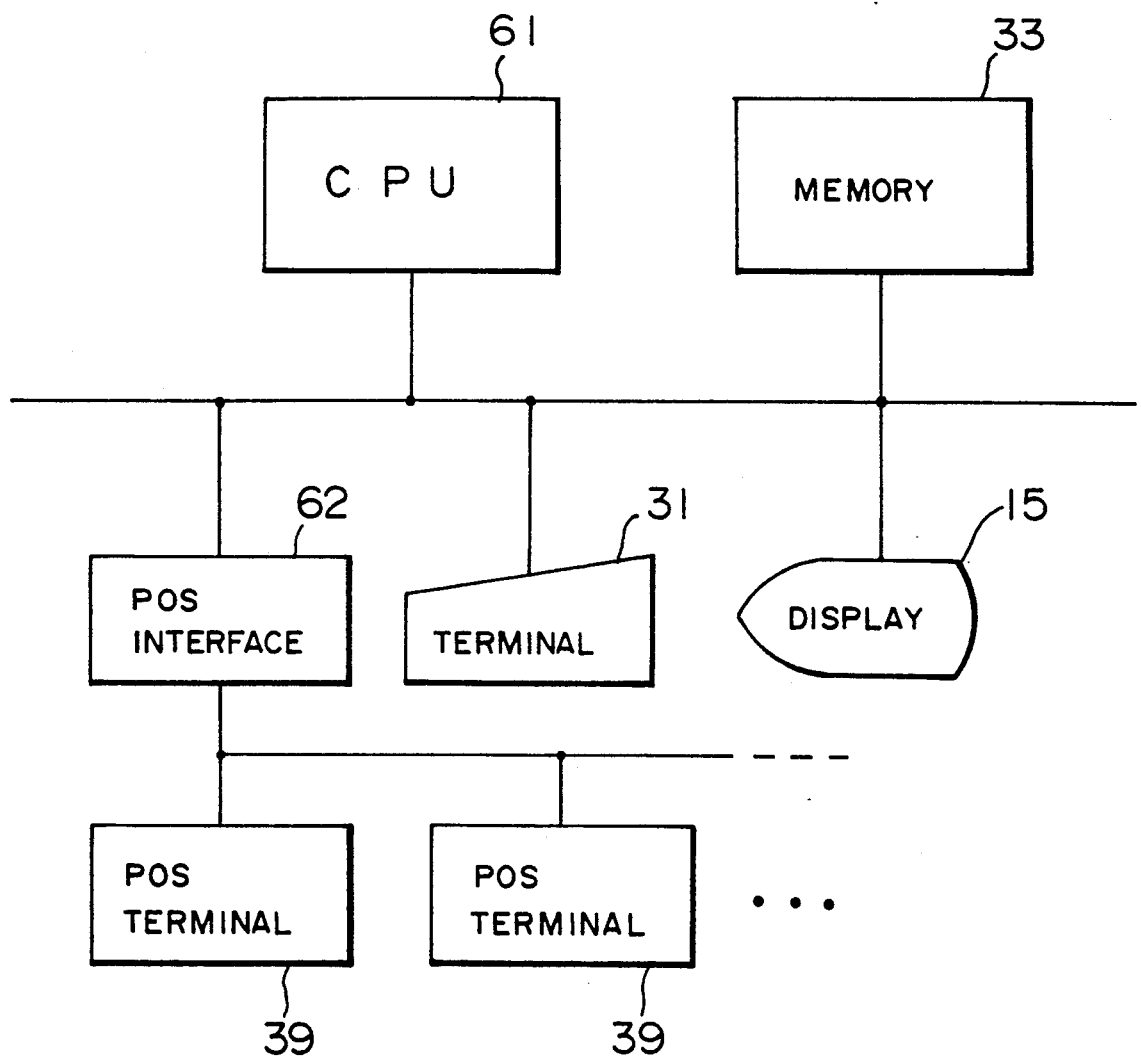

METHOD OF MULTI-DIMENSIONAL ANALYSIS AND DISPLAY FOR A LARGE VOLUME OF RECORD INFORMATION ITEMS AND A SYSTEM THEREFOR

BACKGROUND OF THE INVENTION

The present invention relates to a method and system for displaying a large volume of record information stored in a computer system on a display screen.

Further, the present invention relates to a method and system for analyzing merchandise information used in analyzing sales information of merchandise which is an example of a large volume of record information, and more particularly, to a method and system for analyzing merchandise information which is suitable for analyzing factors for determining promising merchandise by referencing merchandise planning information.

The technique relating to the present invention is described in JP-A-63-261462, JP-A-64-21571, U.S. Patent No. 4,947,322, "Q & A for Utilizing Point-of-Sales Information" by Watada, published by Jitsumu Kyoiku Publishing Co., pp 70-71, and "Facing Control Expert System" by Temma et al, "JOURNAL OF THE SOCIETY OF INSTRUMENT AND CONTROL ENGINEERS" Vol. 27, No. 10. In those methods, the record information in the computer system, i.e. sales information for each of the merchandise, is visually displayed in accordance with display command information such as size information and position information. For example, color scales representing the sales of merchandise (for example, red for high sale and blue for low sale) are displayed on a schematic image as viewed from the front of merchandise shelves. Alternatively, sales and efficiency for stocks per unit space for each selling spot are color coated on a floor layout chart of the store to visually display the information.

A method for collecting point-of-sales (POS) information of the merchandise in a distribution field (so-called input information from cash registers) and utilizing it for sales management and merchandise analysis is discussed in the above-mentioned "Q & A for Utilizing Point-of-Sales Information", by Watada, published by Jitsumu Kyoiku Publishing Co. This reference discusses the importance of determining common factors of the attributes of the merchandise such as material, color, design and pattern for the high sales merchandise. This determination is based on the merchandise sales information of fashion clothes and utilizing the common factors of the attributes of the merchandise for determining additional orders of the merchandise during the sales season and new orders of alternative merchandise. As to the method for analyzing the high sales merchandise, the reference merely discusses the method for calculating the total sales for each of the merchandise attributes such as material and color by the computer system and determining the merchandise attributes which the high sales merchandise has, based on the calculated total sales. In the known method, types such as design are registered as the merchandise attributes together with the merchandise codes, and the total sales for each type of design is calculated.

In the prior art, the position information for displaying the record information is contained in the record information to be displayed, and the record information is displayed in accordance with the position information. Accordingly, the display position information cannot be utilized for extracting the characteristic of the record information. Further, in the prior art, no consideration has been given to a method for displaying the record information in a case where the display position information on the display screen is not imported to the record information to be displayed. A user cannot recognize the characteristic of the record information such as the presence of an abnormal record or trend of a record group, based on the record information which includes listed display and random and non-specified display positions.

Further, in the prior art, the total sale is calculated for each of the merchandise attributes. Accordingly, it is difficult to determine if the promising merchandise comprises groups (blocks) having certain characteristics, and by what combinations of merchandise attributes the respective groups are characterized. Further, it is not possible to precisely analyze the merchandise information of the merchandise if selling depends on the combination of a plurality of attributes. It is also impossible to readily determine by what combination of concepts the promising merchandise is characterized. It is difficult to analyze the relationship between a merchandise planning and development scheme and the high sales merchandise.

The above problems and concepts are based on the following recognition. When merchandise is newly planned and developed, the data of the measurable merchandise attributes such as material and color relating to the promising merchandise is important. The planning intention for the merchandise which is expressed by "fashion feeling" or "positioning" is also important. In the prior art, it is not possible to analyze the sales of the merchandise in accordance with the concept such as "fashion feeling".

SUMMARY OF THE INVENTION

It is an object of the present invention to provide a method and system for easily detecting a general feature of several information items or features of the respective information items.

It is another object of the present invention to provide a method and system for displaying record information by taking display positions of the large volume of record information into consideration, recognizing those records which have abnormal values or characteristics and/or recognizing a characteristic of a record group comprising a plurality of records.

The term "record information" is herein used because the term "record" is used as a unit for processing the information in the computer, although it may be referred to as information.

It is other object of the present invention to provide a method and system for determining characteristics in terms of a combination of merchandise attributes for each of high sales merchandise groups in the merchandise management field, that is, to provide a method and system for extracting a characteristic.

Other objects of the present invention will be apparent from the following description and the accompanying drawings.

In the present invention, the above problems are solved in the following manner to achieve the objects.

Similarities among the attributes of the respective record information items are determined, and the display screen is segmented such that the records having a high similarity are arranged close to each other. The segmented screen is painted in accordance with the color scale of the display information, as required.

In one preferred aspect of the present invention, in a process of segmenting the screen such that the record information items having a high similarity are arranged closely to each other, a hierarchical relation among the record information items is determined based on the similarities among the attributes of the record information, and the screen is sequentially segmented starting from the highest rank of the hierarchy.

When the present invention is applied to the analysis of merchandise information, the following process is used. Merchandise codes representing the merchandise are stored in a table in a memory of the computer system. The merchandise attribute information for each of the merchandise codes is stored in the memory. When the merchandise is sold, the merchandise code of the merchandise sold is entered. The sales data for each merchandise code are accumulated based on the inputs of the merchandise codes at the point of sales. The promising merchandise are selected based on the accumulated sales data for each merchandise. The selected promising merchandise are cluster-analyzed for the merchandise attribute information to determine the number of clusters, the attribute of the center of the cluster and the merchandise which is close to the center of the cluster.

BRIEF DESCRIPTION OF THE DRAWINGS

FIG. 1 (a)-1(d) illustrate an example of structuring a hierarchy of record information based on a directional graph prepared in accordance with similarities among the record information, FIG. 2 shows a process flow chart in one embodiment of the present invention, FIG. 3 shows a format of a record information file, FIG. 4 shows a format of a hierarchical structuring table, FIGS. 5(a)-5(d) illustrate sequential division of a rectangular area, FIGS. 10(a)-10(c) illustrate the cluster analysis, FIG. 16 shows an example of a system configuration for realizing the various embodiments.

DESCRIPTION OF THE PREFERRED EMBODIMENTS

Figures 6, 7:
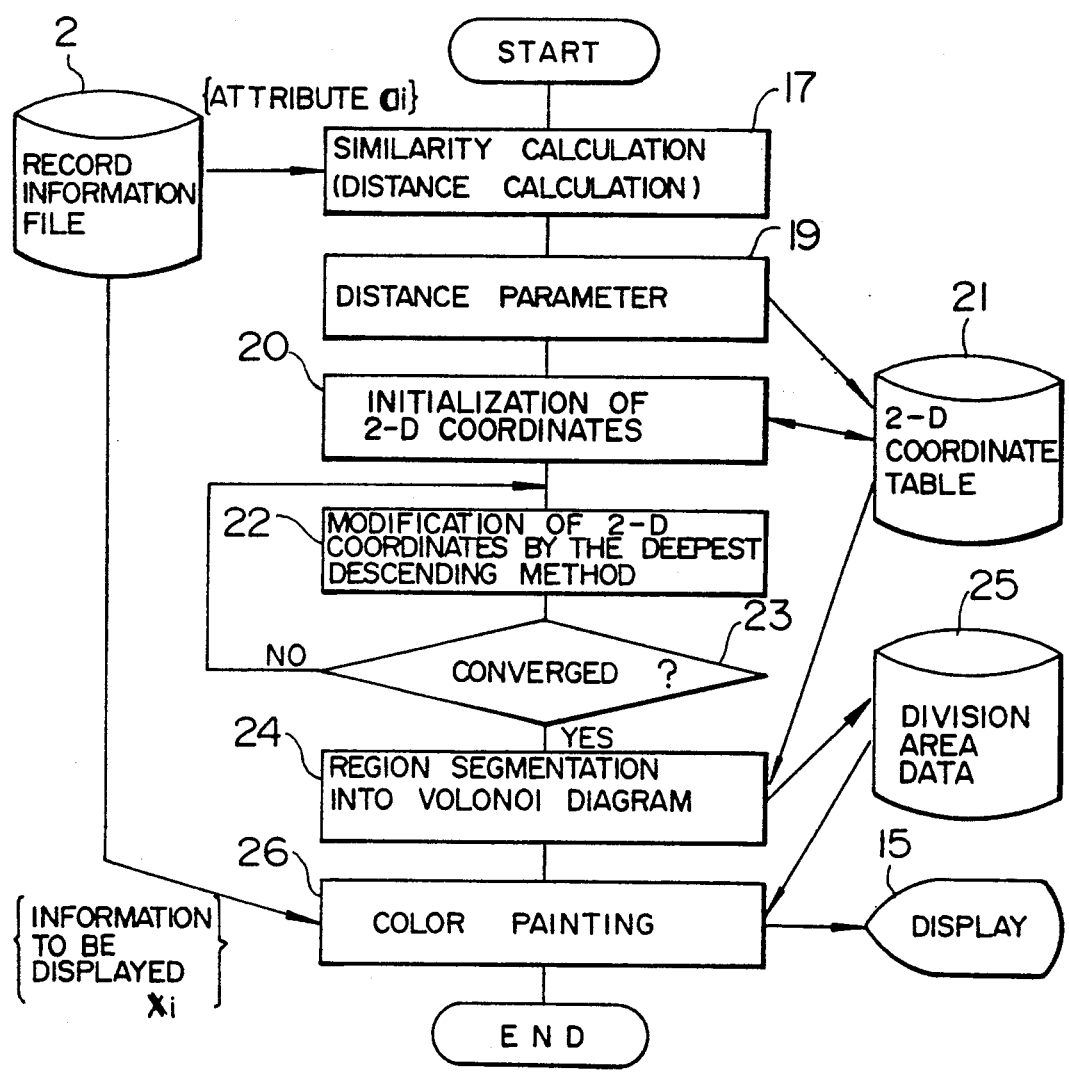
FIG. 6 shows a process flow chart in other embodiment of the present invention.
FIG. 7 shows a format of a 2-D coordinate table.

In order to aid the comprehension of the present invention, a principle of the present invention will be explained.

Assume that N record information items (or records) are present on the computer system. Merchandise information is considered as an example of the record information items. Each record information item includes attribute information and information to be displayed on a screen. The attribute information relating to the i-th record is represented by $a_i$. Information to be represented by area when the display information is divided is represented by $S_i$. Information to be represented by a color or pattern of the segmented region is represented by $X_i = (x^i_1, x^i_2, ... x^i_n)$.

The display screen is segmented into N regions and the N record information items are displayed in the respective segmented regions. A similarity $\gamma(a_i, a_j)$ among the N record information items (among the attribute information or among the display information) is determined. The segmented regions on the display screen are arranged such that the higher the similarity among the record information items is, the shorter the distance between the corresponding segmented regions is. As a result, the records having a high similarity, for example, information on a group of merchandise, are displayed collectively in a specific region on the screen. The merchandise information items having the highest similarity are displayed in adjacent regions. Thus, a relationship among a large volume of collectively displayed record information items can be comprehended based on the mutual positional relationship of the record information. Thus, the overall trend, the merchandise group trend and the abnormal value, can be readily recognized.

For the purpose of the display mentioned above for each record, another record which has a highest similarity is determined so that a hierarchical relation(network) among the records is determined. The screen is sequentially segmented starting from the top of the hierarchy. FIGS. 1(a)-1(d) illustrate the determination of the hierarchical relation among the records. Records are represented by nodes, and a directed arc is drawn to a node of a record j which has a highest similarity $\gamma(a_i, a_j)$ for the records i (i=1, 2, ... ). As a result, several directed and connected graphs are prepared (FIG. 1(a)). Where the entire graph is connected as one directed graph, a pair of nodes having a highest similarity therebetween, which is considered as a center of the graph, is determined and one of them is used as a root node to prepare a tree-structure network. Where the entire graph is expressed by two or more connective graphs (sub-clusters), the process of preparing the tree-structure is repeated for each of the root nodes of the connective graphs and a higher rank tree-structure is determined. This procedure is repeated until the entire graph is represented by one tree-structure (FIGS. 1(a)-1(d). Once a single hierarchical tree-structure is determined for all records, the display screen is divided in accordance with the branching of the tree from the higher rank to the lower rank of the tree-structure hierarchy.

The ends of the tree correspond to N records which have information to be represented by areas, and a total area of branch (a sum of information $S_i$ which corresponds to the lower rank nodes connected to the branch node) is provided to the branch node of each branch. A total sum of display area $$\sum_{i}^{N} S_i$$

is provided to the root node. If the total sum of display area to be provided to the root node is not equal to the area of the display screen on which the areas are to be actually displayed, it may be normalized by the actual display screen area. In segmenting the display screen, it may be segmented by a ratio of lower rank branch nodes to the total display area so that both the similarity among the records and the display area are taken into account in the segmentation. The screen is segmented by vertical or horizontal straight lines. Either the vertical lines or the horizontal lines are selected so that peripheral lengths of the segmented regions are shorter. Which one of the lower rank branch nodes corresponds to which side of the segmenting line is determined by the similarity of the records corresponding to the surrounding segmented regions. Where there are three or more lower rank branch nodes, the total display areas of the respective branch nodes are arranged in a descending order and the display areas are segmented starting from the branch node having the largest area.

The present invention is now explained in detail. FIG. 2 shows a flow chart of the process of the present invention.

In the table initialization, the number N of records and the display areas $\{S_i\}$ of the records are read from a record information file 2 and they are written into an area column of a hierarchical structuring table 3 (step 1). A table format of the record information file 2 of FIG. 2 is shown in FIG. 3. The record information file 2 corresponds to the N records and contains the areas $\{S_i\}$ to be imparted on the display, the attribute information $a_i=(a_{i1}, a_{i2}, ..., a_{iM})$ to be considered in determining the display positions and the display information $X_i$ such as colors, where i represents the record number. Detail of the hierarchical structuring table 3 is shown in FIG. 4. In a step 4, the attribute information $\{a_i\}$ of the records, such as merchandise brands, class codes, colors and prices are read from the record information file 2. Similarities $\gamma(a_i, a_j)$ between the records are calculated by a formula (1). $j=m(i)$, which gives the highest similarity for the record i, is determined as an end point of an arc and it is written into an end point column of the table 3.

$$\tau(a_i, a_j) = \sum_{k=1}^{M} \omega_k \exp(-\alpha_k |a_{ki} - a_{kj}|) \quad (1)$$

where k is an attribute number, M is the number of attributes, $\alpha_k$ is a constant and $\omega_k$ is a weight.

In the step 4, i is further written into a start point column of the table 3 as start point information, for the record of the end point m(i) of each i. In the example shown in FIG. 1, a directed arc is drawn from a record 1 to a record 2. There is no arc which enters into the record 1. The record 1 is provided as the start point for the record 2. The value of a pointer column for controlling a case where there are a plurality of start points is incremented by one. Further, a flag for utilizing the arc to calculate the total area is initialized. In the detection of the center of the sub-cluster, the table 3 is read to detect all record pairs [i, m(i)] which meet $i=m\{m(i)\}$, and "1" is set to each of the higher rank flag columns (step 5). In a step 6 for calculating the sum of areas, the records whose pointers (values in the pointer columns) are zero are detected, and the total display areas of those records are added to the total display areas of the end point records. "−1" is set to the pointer and "1" is decremented from the pointer of the end point record.

The above step is repeated until the records whose pointers are zero are exhausted. For the sub-cluster center records whose high order flags are "1", one of the pair that has a larger total display area is selected, and the total display area thereof is selected as the sum of both while the smaller high order flag is reset to "0".

In the determination of the number of sub-clusters, the number of sub-clusters is determined based on the total sum of the number of "1"s set in the high order flag column (step 7). In the example of FIG. 1(a), the number of sub-clusters is two. If the number of sub-clusters is larger than one, the initialization for the high rank hierarchy is conducted. In the table 3, the records whose high order flags are "1" are detected and they are added at the (N+1) th line et seq. as the sub-clusters (step 8). The total display area is newly set as an area $S_i'$, and the corresponding record number is set for the low order number. In the example of FIG. 1, it is determined that the total display area $(S_1+S_2+S_3+S_5)$ of the record 3 is larger than that $(S_{4+S6})$ of the record 4. The first sub-cluster 3' as well as the area $S_3'=(S_1+S_2+S_3+S_4+S_5+S_6)$ are set into the hierarchical structuring table 3. Similarly, the second sub-cluster 7' is also set. After the above initialization for the higher rank hierarchy, the writing of the table 3 by setting the directed arc starting from the step 4 is repeated.

If it is determined in the step 7 that the number of sub-clusters is one, this means that the tree structure shown in FIG. 1(d) has been constructed in the table 3. Thus, the display screen is segmented by tracing the tree by the low order numbers and the start point record numbers, starting from the line of the table 3 of the root node 3". In the setting of the display region shape, a vertex coordinate of the region shape on the display screen is set in a region vertex coordinate column of the table 3 (FIG. 4) (step 9). In the segmentation of the display region, the low order number for the record of the root node or the start point record number is checked. If only the low order number is significant, the same area vertex coordinate is set into the region vertex coordinate column of the low order number record. If the start point record number is included, a vertical or horizontal straight line is defined to separate the total display re ion of the start point record from the total display region of the corresponding record, and the vertex coordinates of the two new display regions are determined (step 10). In the setting of the segmented region shape, the vertex coordinates of the display regions determined in the step 10 are written into the region vertex coordinate column of the table 3 (step 11). In the search of the record which requires the segmentation, the contents of the region vertex coordinates of the table 3 are checked in an ascending order and the records to be segmented are searched for (step 12). If there is a region which is to be further segmented is found as a result of the search, the steps 10 et seq are repeated in a step 13.

If there is no region to be segmented, a color pointing step of the segmented region is effected to sequentially point the N region vertex information of the table 3 (step 14). The pointing colors are selected by the transform of the display information $x_i$ read from the record information file 2, by the color scale. A net pattern scale may be used instead of the color scale. The painted region shape data are sent to a display unit 15. If the end of the display of all N segmented regions is detected in a step 16, the process is terminated. FIGS. 5(a)-5(d) show a manner to segment a rectangular display area. FIG. 5(a) illustrates the segmentation of the node 3'' which represents the total area of the display screen into areas which represent the node 3' and the node 7'. FIG. 5(b) illustrates the segmentation of the region represented by the node 3' into the sum area of the nodes 1 and 2, and the sum area of the nodes 3, 5, 4 and 6. FIG. 5(c) illustrates the segmentation of the node 7' into the node 7 and the node 8. FIG. 5(d) illustrates the segmentation into the nodes 1-8.

In accordance with the present embodiment, when a large volume of record information which the is stored in the computer system is to be displayed on the segmented screen by colors and patterns, the information having high similarity are arranged closely to each other so that the records of abnormal contents and the trend of the record group comprising the information having a high similarity are readily recognized. The information may be allotted to the display areas (the display areas have significances) so that the types of information which can be recognized at a glance may be increased.

A second embodiment of the present invention is now explained with reference to FIG. 6. In the similarity calculation, the attribute information items $\{a_i\}$ are read from the record information file 2 of FIG. 3 and the similarity is calculated in accordance with the formula (1) (step 17). Since it is hard to use the similarity as it is in the subsequent steps, it is transformed to a distance $d_{ij}$ which is identical in the information content but in which the magnitude relationship is opposite and it is zero when the records are equal.

$$d_{ij} = \left(\sum_k \omega_k\right) - \tau(a_i, a_j) \tag{2}$$

where $\omega_k$ is the weight in the formula (1).

The N records are projected to N points on a plane by an iterrative calculation which uses a deepest descending method such that the distance relation of the formula (2) is met with a minimum square error. Before the iterrative calculation is started, parameters used in the iterrative calculation and the initial values of the N coordinates on the plane are determined. In a distance parameter calculation step 19, $$Q = 2\beta / \left(\sum_{i<j}^{N} d_{ij}\right) \tag{3}$$

is calculated. In a step 20, the N coordinates on the plane are set at constant pitch grid points expressed by $$(Yi1, Yi2) = (l \bmod(i, M), l \operatorname{trunc}(i, M)) \tag{4}$$

where, $M = \operatorname{trunc}(\sqrt{N} + 1, l = L/M$
and they are stored in a 2-D coordinate table 21.

Figures 8, 9:
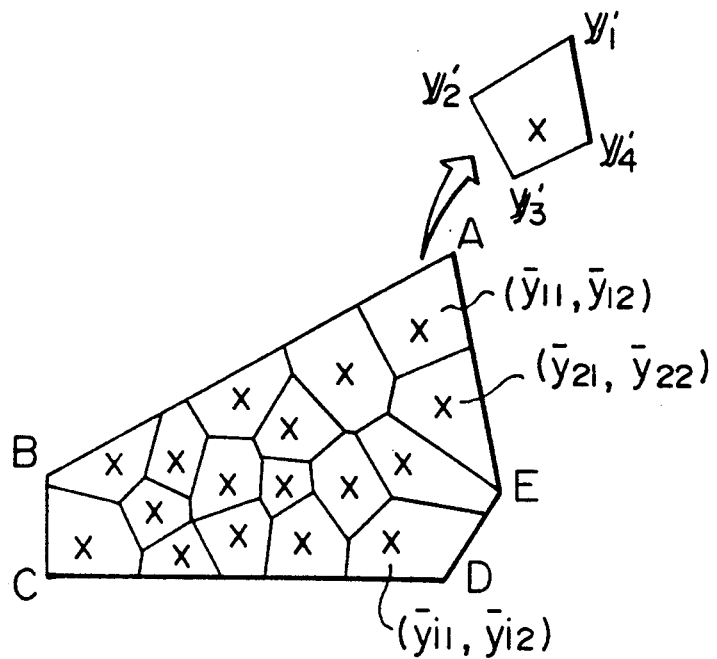
FIG. 8 illustrates the segmentation of a display area by a Volonoi diagram.
FIG. 9 shows a format of a segmented region data table.

In a deepest descending method step 22, updated coordinates $\{Yi1^{(t+1)}, Yi2^{(t+1)}\}$ are determined based on the old coordinates $\{Yi1^{(t)}, Yi2^{(t)}\}$ of the 2-D coordinate table 21 in accordance with $$d_{ij}^* = \sqrt{\sum_{P=1}^{2}(y_{ip}(t) - y_{jp}(t))^2} \tag{5}$$

$$D_{ij} = (d_{ij} - d_{ij}^*)/(d_{ij}d_{ij}^*) \tag{6}$$

$$y_{ip}(t+1) = y_{ip}(t) + Q \sum_{\substack{j=1 \\ j \neq i}}^{N} D_{ij}\{y_{jp}(t) - y_{ip}(t)\} \tag{7}$$

$$p = 1, 2$$

and they are written into the 2-D coordinate table 21. In a table format of the 2-D coordinate table 21 shown in FIG. 7, the area center coordinates correspond to the respective record numbers. In a step 23, a difference between the old coordinate and the new coordinate is determined, and if it is smaller than a predetermined value, it means the convergence and the iterrative calculation is terminated. In a Volonoi diagram segmentation step 24, a Volonoi diagram for converging points $(Y_{i1}, Y_{i2})$ is prepared as shown in FIG. 8, and the vertex coordinates of polygons in the segmented regions are stored into segmented region data 25. In FIG. 8, two-dimensional positional coordinates of the seventeen converging points indicated by the mark X and the surrounding areas (A-E) are shown. The segmental lines of the Volonoi diagram are normal bi-sectional lines of the converging points $Y_{i1}, Y_{i2}$) of the segmented region centers on the opposite sides. Accordingly, the corresponding converging point is the closest converging point from a point in each of the segmented regions. As shown in FIG. 8, the vertex of each region i is represented by a coordinate string $(Y^i_1, Y^i_2, ... Y^i_{Ci})$, where $C_i$ is the number of vertices. FIG. 9 shows a table format of segmented region data 25. In a segmented region color painting step 26, the segmented areas corresponding to the N records are read from the display information $\{xi\}$ of the record information file 2 and they are transformed to colors or patterns in accordance with the color scale or the pattern scale, and the segmented regions are painted. They are then sent to the display unit 15. In this manner, the segmentation of the display region such that the similar information are arranged as closely as possible is attained with the similarity relationship being retained as much as possible.

In the present embodiment, the record information includes a turnover rate of the merchandise, profit, and sales growth rate. The record attributes include brands of the merchandise, classifications in the stores, manufacturers, colors, sizes, prices, materials and types. A merchandise information display system which displays several thousands of those merchandise information items on the sales floor layout chart including walksides, by segmenting the sales floor region is provided. The merchandise attributes are numerically represented by code scheme. Where a totally different attribute is represented if the numeral changes even by one, the constant $\alpha_k$ of the formula (1) for that attribute is selected larger, and if the closeness of the numerical value and the closeness of the attribute are to be expressed, the constant $\alpha_k$ is selected smaller. By the selection of the weight $\omega_k$, the display of the information, which complies with the user's desire, such as the display of the merchandise information weighted by the brands or the display of the merchandise information weighted by the classifications in the store is attained.

The shape of the sales floor is usually non-fixed polygonal, and it is not always rectangular as shown in FIGS. 5(a)-5(d) in the first embodiment. However, so long as it is a polygon, the area thereof can be easily calculated by a sum of areas of triangles. Accordingly, the region segmentation step 10 of FIG. 2 is equally applicable to a polygon other than the rectangle.

In the present embodiment, the record information having the information to be displayed by area and the information to be displayed by color has been discussed. In many cases, however, the record information is one-dimensional. In such cases, the one-dimensional information may be displayed by treating it as area information. In such a case, the screen segmentation in the present embodiment may be used. In order to distinguish the type of record information, different colors may be set to the regions of the respective records, or boader lines of the regions may be displayed.

A third embodiment in which a characteristic is extracted from the record information is now explained. In order to facilitate the understanding, a principle of the cluster analysis relating to the merchandise attribute information of the promising merchandise group, particularly the cluster analysis when key words as the merchandise attributes have been imparted, which is one of the features of the present invention, is explained.

In FIG. 10(a), the analysis on the coordinate $x_1-x_2$ of the attributes of the merchandise of the promising merchandise group having two merchandise attributes $x_1$ and $x_2$ is shown by marks X.

The merchandise group can be divided into three blocks $\omega_1$, $\omega_2$ and $\omega_3$ as shown in FIG. 10(a), and the center attributes thereof are shown by marks ● having the coordinates $(x^{-1}_1, x^{-1}_2)$, $(x^{-2}_1, x^{-2}_2)$ and $(x^{-3}_1, x^{-3}_2)$. FIGS. 10(b) and 10(c) show the distributions of the total sales for the attributes $x_1$ and $x_2$, respectively. The information on the three blocks is not obtained from those graphs and it is not possible to precisely know what attribute the promising merchandise has. However, by using the well-known cluster analysis method, for example, ISODATA method ("Basic of Multi-Variable Analysis" by Kawaguchi, published by Morikita Publishing Co.), the number of blocks and the blocks to which the respective merchandise belong are determined. Further, the center of the distribution, the attribute closest to the center of the distribution, and the variance of the distribution are determined. Since the third distribution $\omega_3$ has a large variance for the attribute $x_2$, it is seen that only the mean value $x^{-3}_1$ of the attribute $x_1$ is the factor of promising for the third distribution.

Figure 11:
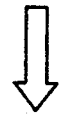
FIG. 11 illustrates a transform process of free key words.

In the above example, the merchandise attributes are represented by continuous quantities. The clustering of the merchandise when the merchandise attributes are represented by discontinuous quantities such as term "intention of merchandise planning and development" is explained with reference to FIG. 11. Free key words previously registered for l promising merchandise are represented by $a^i_1, a^i_2, ..., a^i_{m(i)}$, for a merchandise code i. The codes i and j used here are different from those used in the previous embodiment. m(i) represents the number of free key words. A joint set of the registered free key words for the l promising merchandise is represented by $a^*_1, a^*_2, ... a^*_N$ which is a sum of the free key words which appeared at least once. Whether each promising merchandise includes those free key words or not is represented by "1" or "0". Thus, the merchandise attribute of the merchandise code i is represented by $$X_i = (x^i_1, x^i_2, ..., x^i_N)$$

where $x^i_j = 0$ or 1, j = 1, 2, ..., N

The value $x^i_j$ assumes either "0" or "1". Since it is expressed as vector data, the same cluster analysis method as that for the continuous quantities described above may be used. When the center of the block of the merchandise distribution is determined from the result of the clustering, each element of the value $x^{-k}$ assumes a real number. Therefore, fractions of 0.5 and over thereof are counted as one and the rest thereof is cut away to produce either "1" or "0". The free key word which characterizes each distribution may be selected from the elements processed in the manner described above, which have the value "1" and whose variance is smaller than a predetermined value.

In this manner, the promising merchandise group classified into several classes and the key words which characterize the merchandise groups are obtained from the free key words which represent the intention of the merchandise planning and development.

An embodiment which implements the present invention by a computer system is explained with reference to a flow chart shown in FIG. 12. A new registration of merchandise (for example, a highly seasonal fashion merchandise) is commanded from a computer terminal 31. In a merchandise code setting step 32, in response to the command of new registration, a maximum value of the merchandise code of a merchandise code table 34 in a memory 33 is incremented by one. The merchandise code is numerical information, and the merchandise codes are assigned in an ascending order in the order of registration of the merchandise. The maximum value of the assigned merchandise codes which has been stored in the memory 33 is thus incremented by one. The incremented merchandise code is written into the merchandise code table 34. The merchandise code is also sent to the computer terminal 31. A price tag having the merchandise code printed out thereon is attached to the corresponding merchandise. On the other hand, the attribute of the merchandise is input by the computer terminal 31. In a merchandise attribute information input step 36, the following attributes input by the computer terminal 31 are written into an attribute information table 37 corresponding to the new merchandise code 34 on the memory 33.

(1) Name
(2) Bland
(3) Price
(4) Color
(5) Material
(6) Pattern
(7) Merchandise planning and development concept Further, the sales plan of the merchandise, for example, the number of sales is input and it is set in a plan data table 44 for the corresponding merchandise code. A sales data area 38 of the newly registered merchandise is initialized to "0".

In a code input step 40, when the merchandise is sold, the code printed on the price tag of the merchandise is inputted from a POS (point-of-sales) terminal 39. In a merchandise sales calculation step 41, the sales data 38 of the inputted merchandise code and the price in the attribute information 37 are read from the memory 33, the price is added to the sales data, and the sum is written into the sales data 38. The steps 40 and 41 relating to the merchandise sales are repeated while no request for merchandise analysis is issued (NO in a step 42). When the request for merchandise analysis is issued, a promising merchandise discrimination step 43 is initiated. The plan data 44 registered in the memory 33 when the attribute was inputted in the merchandise attribute information input step 36, and the sales data 38 in the memory 33 are read, and the merchandise which has been sold beyond the plan is discriminated and the merchandise code thereof is determined. In a cluster analysis step 45, the attribute information 37 in the memory 33 relating to the merchandise code determined in the promising merchandise discrimination step 43 is read and the cluster analysis for the promising merchandise is conducted.

Figure 13:
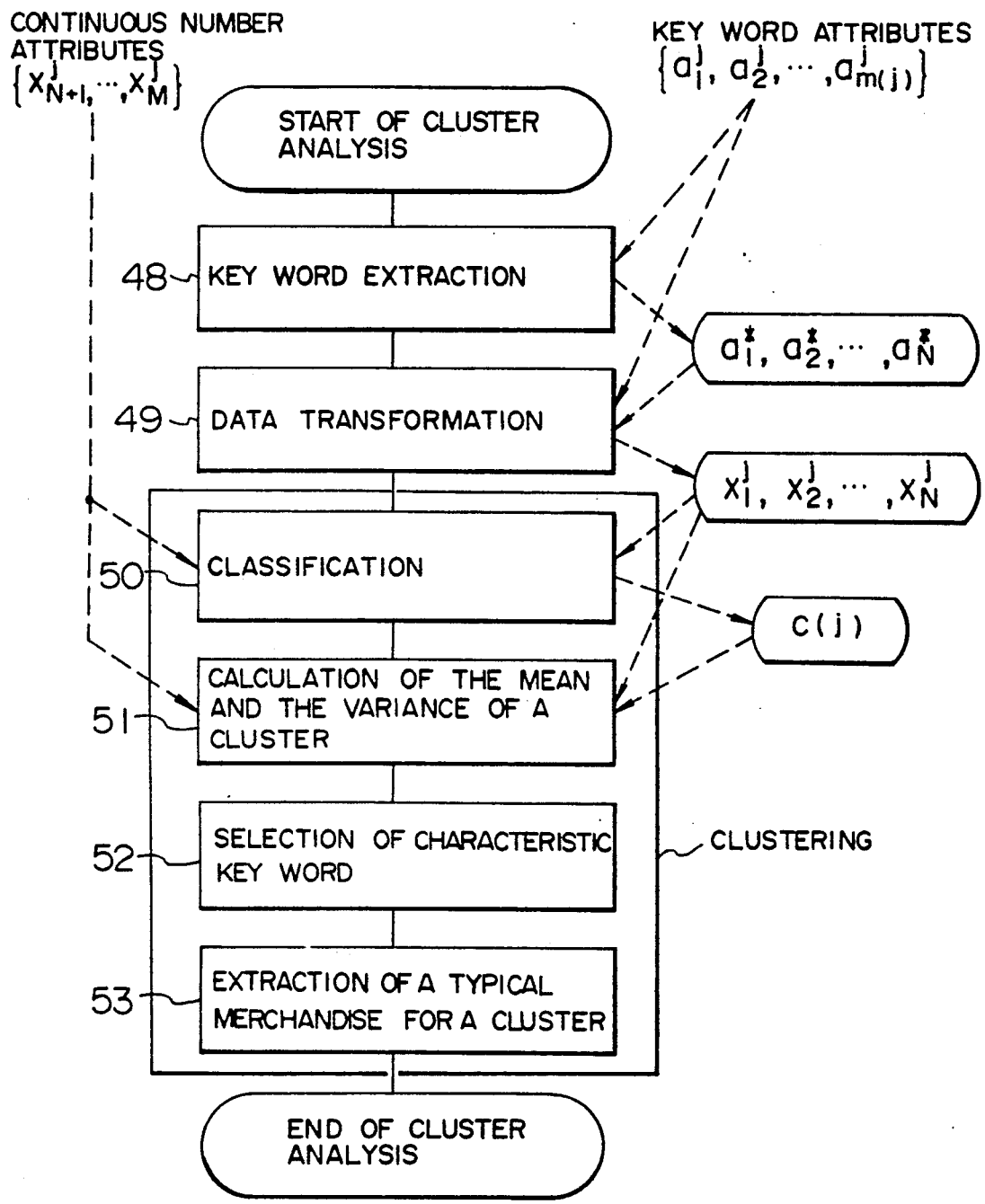
FIG. 13 shows a process flow in the cluster analysis in the embodiment shown in FIG. 12.

A detailed process flow of the cluster analysis step 45 is explained with reference to FIG. 13. In a key word extractions step 48, free key word group $\{a^j_1, a^j_2, ..., a^j_{m(j)}\}$ $j=1, ..., l$ which comprises predetermined free key words, of the merchandise attribute information relating to the l merchandise read from the attribute information 37, is read. A joint set of the free key words, that is, a string of the key words which appeared at least once, $\{a^*_1, a^*_2, ..., a^*_{N1}\}$ is determined, where m(j) is the number of free key words assigned to the j-th promising merchandise, and N is the number of free key words counted for all promising merchandise without double counting. In a data transformation step 49, for each of the N elements of the joint set $\{a^*_1, a^*_2, ... a^*_N\}$, "1" is set if it is included in the free key words $\{a^j_1, a^j_2, ... a^j_{m(j)}\}$ assigned to the j-th promising merchandise, and "0" is set if it is not included, to produce an N-element string of "1" and "0" $\{x^j_1, x^j_2, ... x^j_M\}$. The above step is repeated from j=1 to j=l. In a cluster classification step 50, the cluster classification is conducted for $\{x^j_1, x^j_2, ... x^j_M\}$ which is a combination of the continuous amount attributes $\{x^j_{N+1}, ... x^j_M\}$ such as size or price and the key word attributes $\{x^j_1, x^j_2, ... x^j_N\}$ produced in the data transformation step 49. As the cluster classification algorithm, many methods including ISODATA method have been proposed In any cluster classification algorithm, the number P of the clusters (blocks) of the promising merchandise and the cluster c(j) which the j-th merchandise belongs to are determined. In a cluster mean/variance calculation step 51, mean attribute of each cluster $x^{-c} = \{x^{-c}_1, x^{-c}_2, ... x^{-c}_M\}$ and a variance $\sigma^c (c=1\sim P)$ are determined based on the result c(j) of the cluster classification step 50 and the attributes of the promising merchandise $(x^j_1, x^j_2, ... x^j_M)$, $j=1\sim l$. In a characteristic key word selection step 52, those of N key word attributes which are larger than a predetermined value (for example 0.7) are selected for each cluster c, and they are arranged to produce a key word string which characterizes the cluster c. On the other hand, in a typical merchandise extraction step 53, the merchandise which has a shortest Euclid distance from the mean attribute $x^{-c}$ of the cluster c is selected and a merchandise code thereof is outputted as a typical merchandise of the cluster c.

Figure 12:
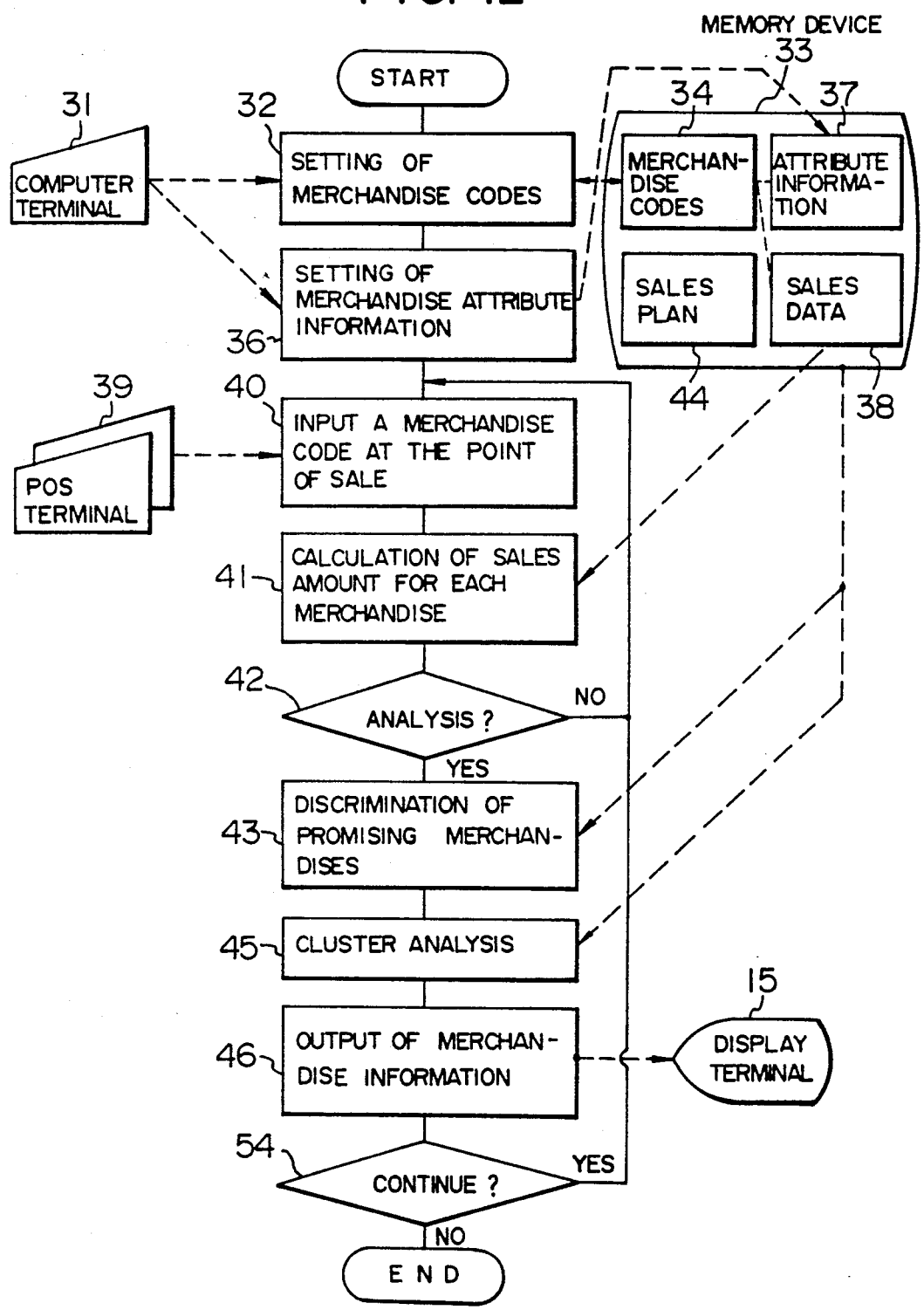
FIG. 12 shows a process flow chart in a further embodiment of the present invention.

In the merchandise information output step 46 of FIG. 12, the result of the promising merchandise cluster analysis step 45, that is, the number p of clusters, the key words which characterize the cluster, the mean continuous amount attribute $\{x^{-c}_{N+1}, ..., x^{-c}_M\}$, the typical merchandise code, and the total sales of the cluster, are outputted to the display unit 15. The above process flow is terminated if an end step 54 produces Y when the stock of the merchandise set in the merchandise code setting step 32 has been exhausted at the end of the selling season of the merchandise.

In this manner, the grouping of the promising merchandise and the merchandise attributes which characterize those groups can be automatically analyzed In the present embodiment, the free key words which represent the intention of the merchandise planning are imparted as the merchandise attributes of the merchandise to be analyzed so that the free key words which characterize the promising merchandise are analyzed. Further, the merchandise attributes which have the continuous amount attributes can also be analyzed.

Figure 14:
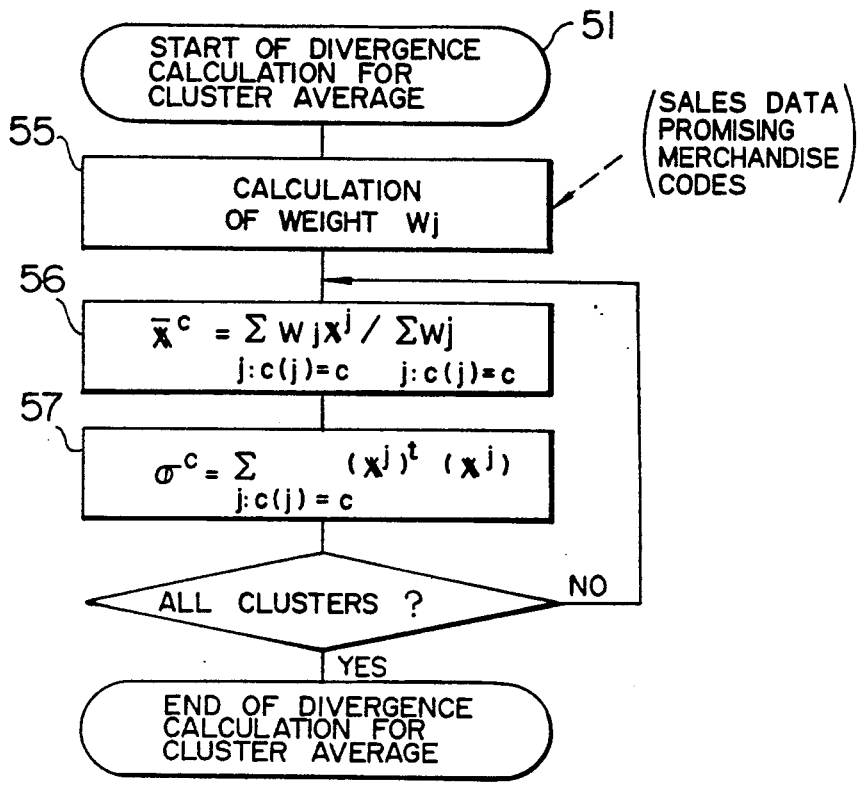
FIG. 14 shows a process flow chart of a modification of a cluster mean/variance calculation process.

In other embodiment shown in FIG. 14, the merchandise information is analyzed by the cluster analysis method which includes weighting in accordance with the sales of the merchandise. In the previous embodiment, the cluster mean/variance calculation step 51 of FIG. 13 is conducted by calculating a simple mean value of the clusters based on the result of the cluster classification c(j) and the attributes of the promising merchandise $\{x^j_1, x^j_2, ..., x^j_M\}$. In the present embodiment, as shown in FIG. 14, the sales data of the promising merchandise j is read and set as a weight $\omega_j$. A weighted mean value calculation step 56 and a variance calculation step 57 are conducted for each cluster c, and the above steps are repeated as many times as the number p of clusters.

In this manner, the cluster analysis which takes the absolute value of the merchandise sales into account, that is, the extraction of the attributes and the key words which characterize the clusters and the extraction of the cluster typical merchandise are attained.

Figure 15:
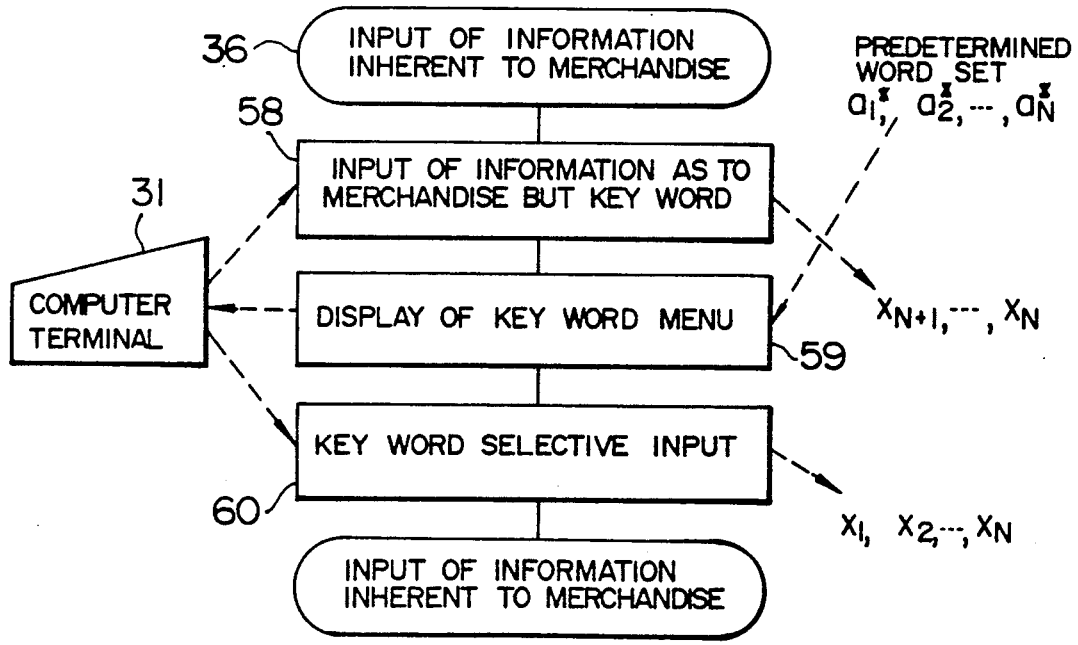
FIG. 15 shows a process flow of a modification of a merchandise attribute information input process.

In other embodiment, in the merchandise attribute information input step 36 of FIG. 12, the key words selected from the previously set key words on the computer system are inputted instead of the free key words for the merchandise. As shown in FIG. 15, in the present embodiment, the merchandise information other than the key words is inputted in a step 58 of the merchandise attribute input process 36, and then a group of key words $\{a^*_1, a^*_2, ..., a^*_N\}$ are displayed on the computer terminal 1 as a key word menu for use in a key word menu display step 59. In the step 59, the operator of the computer terminal sets "1" to the key words which he/she selected from the menu, and sets "0" to the key words which he/she did not select to produce the key word attributes $\{x_1, x_3, ..., x_N\}$. In the present embodiment, the inputting of the key word attributes is simplified.

In a further embodiment, in the merchandise attribute input process 36 of FIG. 12, the color attributes of the merchandise are inputted by decomposing the colors to three principal colors, red, green and blue and inputting the intensities thereof as continuous numerical values, instead of inputting the color codes of several typical colors.

In accordance with the present embodiment, the delicate colors which are hard to express by words can be precisely separated and the distance between the two colors can be calculated. Accordingly, the cluster analysis may be used.

In accordance with the embodiments relating to the cluster analysis of the merchandise information, the clusters or blocks of the promising merchandise, the characteristic attributes of the clusters and the typical merchandise are automatically presented by th merchandise information analysis.

An example of a system configuration which realizes the above embodiments is shown in FIG. 16.

The system configuration shown in FIG. 16 comprises a CPU 61, a memory 33 connected to the CPU 61, a display 15, a computer terminal 31, a POS interface 62, and a POS terminal 39 connected to the POS interface 62.

The process flows shown in the above embodiments are executed in the CPU 61. The memory 33 contains a program to be executed by the CPU 61 and various tables, which include the record information file 2, the hierarchical structuring table 3, the 2-D coordinate table 21, the segmented region data table 25, the merchandise code table 34 and the sales data table 38. The display 15 is a color graphic display in a preferred embodiment of the present invention, although it may be a monochromatic display, as seen from the above explanation. The computer terminal 31 is used to enter the commands and data necessary for the execution of the program in the CPU 61. The POS terminal 39 is connected to the CPU 61 through the POS interface 62. The POS terminal 39 is located on a sales floor in most case and a communication apparatus is usually connected between the POS interface 62 and the POS terminal 39 although it is omitted in the drawing because it is known to those skilled in the art.

In accordance with the present invention, in a method for displaying the record information in the computer system on the display screen by segmenting the record information, the similarities among the record attributes are determined even if the position information on the display screen is not provided, and the records having higher similarities are arranged closer. Accordingly, the user of the information may consider the mutual positional relation of the record information and can recognize the records having abnormal contents and the trend of the record group having the high similarity.

We claim:

1. A method for displaying a plurality of information items including display data and attributes thereof, comprising steps of:
    extracting, from said plurality of information items, first information items contained in said plurality of information items and second information items having a high similarity with respect to an attribute of said first information items, for each of said plurality of information items;
    preparing a directed graph having nodes corresponding to said plurality of information items and having arcs connecting said second information items to said first information items;
    transforming said directed graph to a tree-structure graph representing a whole set of said plurality of information items by a root node, subsets of said plurality of information items by branch nodes and respective ones of said plurality of information items by terminal nodes;
    segmenting a display region iteratively into a plurality of display positions for each branch node arranged between said root node and said terminal nodes of said tree-structure graph, wherein each segmenting iteration is executed from said root node to said terminal nodes by segmenting a region for a pre-segmented node into several regions which correspond to the branch or terminal nodes connected to said presegmented node; and
    displaying each of said plurality of information items at a corresponding one of the positions of the 2. The method for displaying a plurality of information items according to claim 1 wherein the displaying includes displaying said plurality of information items at the each position of the segmented regions according to the attributes of all information items included in each of said plurality of information items.

3. A method for displaying a plurality of information items comprising steps of:
    extracting, from said plurality of information items, first information items contained in said plurality of information items and second information items having a high similarity with respect to an attribute of said first information items, for each of said plurality of information items;
    setting a distance between said first information items and said second information items such that the first and second information items are arranged closer as the similarity between the first and second information items is higher;
    setting display positions of said first information items and said second information items in accordance with said distance;
    projecting said first information items and said second information items at points in a display plane such that said distance between said first information items and said second information items is maintained; and
    segmenting of said display plane by a Volonoi diagram of projected points.

4. An information display system comprising:
    a memory for storing a plurality of information items including display data and attributes thereof;
    a display unit, and
    a CPU connected to said memory and said display unit for executing a program, the CPU including;
    means for extracting, from said plurality of information items, first information items contained in said plurality of information items and second information items having a high similarity with respect to an attribute of said first information items, for each of said plurality of information items stored in said memory;
    means for preparing a directed graph having nodes corresponding to said plurality of information items and having arcs connecting said second information items to said first information items;
    transform means for transforming said directed graph to a tree-structure graph representing a whole set of said plurality of information items by a root node and respective ones of said plurality of information items by terminal nodes;
    segmentation means for segmenting the display region of said display unit iteratively for a branch node between said root node and said terminal nodes of said tree-structure graph wherein each segmenting iteration is executed from said root node to said terminal nodes by segmenting a region for a presegmented node into several regions which correspond to the branch or terminal nodes connected to said presegmented node; and
    output means for selectively painting each segmented display region by gray levels, colors, and screen patterns respectively corresponding to each of said plurality of information items and outputting painted display region data to said display unit.

5. The information display system according to claim 4 wherein said plurality of information items are merchandise related information.

6. The information display system according to claim 5 wherein said display region corresponds to a sales floor layout chart of the merchandise.

7. A method for analyzing merchandise information comprising steps of storing data of merchandise and prices and other attributes of merchandise in said memory;
- inputting said data of the merchandise at a point of sales of the merchandise;
- accumulating said prices to obtain accumulated sales data of the merchandise in response to the input of said data of the merchandise;
- storing with accumulated sales data in said memory together with said data of the merchandise;
- selecting promising merchandise whose accumulated sales data are more than pre-set values, from said merchandise;
- analyzing the promising merchandise in a multi-dimensional space whose dimensions represent said attributes using a mathematical cluster-analysis method;
- obtaining merchandise information which describes characteristics of the promising merchandise based on a result of the cluster analysis;
- storing attribute data of the merchandise together with the data of the merchandise wherein the attribute data of the merchandise are key words;
- selecting the attribute data close to a center of clusters from said attribute data based on the result of said cluster analysis.

8. The method for analyzing merchandise information according to claim 7 wherein said cluster analysis step includes steps of:
- determining a set of key words of the promising merchandise;
- transforming the set of key words to a set of "0"s and "1"s;
- and clustering the set of "0"s and "1"s.

9. A method for analyzing merchandise information containing various attributes by a computer comprising the steps of:
- analyzing a plurality of merchandise in a multi-dimensional space whose dimensions represent said attributes using a mathematical cluster-analysis method wherein the attributes of the merchandise are represented by key words;
- grouping the plurality of merchandise based on a result of the cluster analysis; and
- producing attributes which describes characteristics of respective groups of the plurality of merchandise.

* * * * *

UNITED STATES PATENT AND TRADEMARK OFFICE
CERTIFICATE OF CORRECTION

PATENT NO. :     5,179,643
DATED      :     January 12, 1993
INVENTOR(S) :    Koichi Homma, et al.

It is certified that error appears in the above-identified patent and that said Letters Patent is hereby corrected as shown below:

Claim 1, column 13, line 67, after "positions of the" insert --segmented display region, based on the transforming and the segmenting.--.

Claim 7, column 15, line 13, delete "with" and insert therefor --the--.

Signed and Sealed this

Nineteenth Day of October, 1993

Attest:

BRUCE LEHMAN

Attesting Officer          Commissioner of Patents and Trademarks